Jan. 27, 1970  S. C. McLENDON  3,491,476
FISHING LURE
Filed Nov. 3, 1967
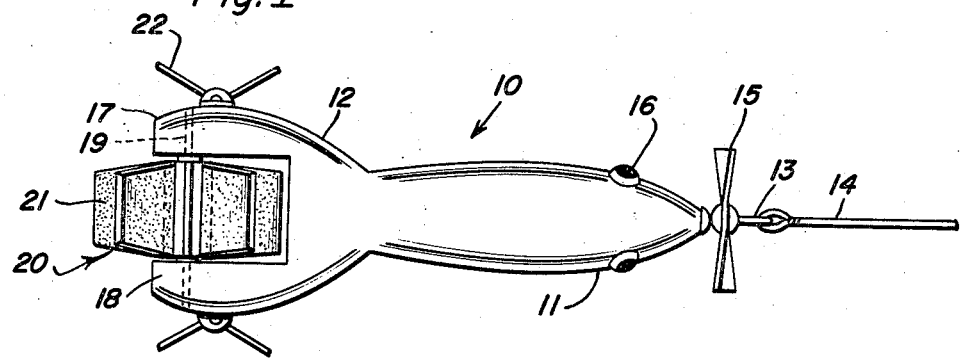
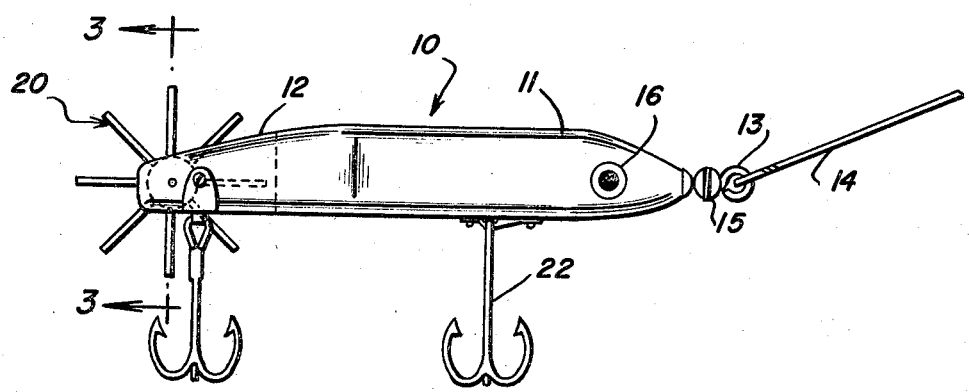
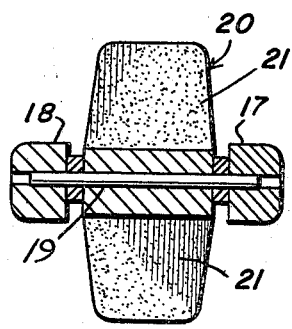
Shelby C. McLendon
INVENTOR.
BY William M. Hobby
ATTORNEY

United States Patent Office 3,491,476
Patented Jan. 27, 1970

3,491,476
FISHING LURE
Shelby C. McLendon, P.O. Box 235,
Eustis, Fla. 32726
Filed Nov. 3, 1967, Ser. No. 680,497
Int. Cl. A01k *85/00*
U.S. Cl. 43—42.12                                3 Claims

ABSTRACT OF THE DISCLOSURE

A fishing lure apparatus for plug or spin casting, having an elongated body with two rear legs. A paddlewheel, connected between the rear legs, has blades which extend rearwardly beyond the rearward extremities of the legs and rotates as the lure is pulled across the surface of the water. The paddlewheel has a reflective material on its surface for reflecting light into the water whereby the fish are attracted by both the movement of the paddlewheel and the reflecting light. The lure has a spinner on the front end of the elongated body, hooks, artificial eyes, and an eyelet for attaching a fishing line.

BACKGROUND OF THE INVENTION

Field of the invention

The present invention relates to fishing lures and especially to those fishing lures for use in plug or spin casting. More specifically, the present invention relates to those fishing lures that float on the water and has an elongated body with an eyelet connected to the front end for attaching a fishing line.

The rear of the elongated body has two legs with a paddlewheel rotatably connected between the legs. The paddlewheel has reflective material on its surface so that when the plug is pulled through the water, the paddlewheel will rotate, reflecting light into the water, which along with the motion and noise of the rotating paddlewheel, attract the attention of the fish. The lure also may have a spinner connected to the eyelet and will have hooks and may be decorated as desired such as by painting to resemble a frog, or the like.

Description of the prior art

In the past, a great variety of artificial fishing baits and lures have been available. Many of these prior art lures have attempted to imitate frogs, birds, bugs, flies, worms and other live bait. Prior art lures have used propellers, spinners, and wheel devices to give a sound effect or to provide motion in the water for attracting the attention of the fish or for imitating the motion of a bird, or frog, or the like, in the water.

In contrast to these prior art devices, I provide a lure having a paddlewheel located at the rear of the lure and which has small pieces of reflective material placed thereon to provide a glittering reflection of light into the water when the paddlewheel rotates, in addition to providing the usual motion and sound effects.

Prior art rotating devices have usually been narrower than mine since only motion and noise were being generated but to provide better reflection of light, I have used a wider paddlewheel with more paddles than is usually provided on a rotating wheel.

In addition, I have provided a lure with a new body configuration and a new combination of features in the fishing lure art.

BRIEF DESCRIPTION OF THE DRAWINGS

Other objects, features and advantages of this invention will be apparent from a study of the written description and the drawings in which:

FIGURE 1 is a top view of the present invention;
FIGURE 2 is a side view; and
FIGURE 3 is a cutaway end view taken along lines 3—3 of FIGURE 2.

DESCRIPTION OF THE PREFERRED EMBODIMENT

Referring to FIGURE 1, there is shown a top view of my invention, having an elongated body 10 with a front portion 11 and a rear portion 12. The front portion 11 has an eyelet 13 connected thereto which may be screwed into the front or molded thereto as part of the manufacturing process. Eyelet 13 is adapted for connecting a fishing line 14 thereto and may also be provided with a rotatably mounted spinner 15. Artificial eyes 16 may be positioned on the front portion of the body 10. The rear portion 12 of the elongated body 10 is divided into two separated legs 17 and 18 which is seen as an enlarged rear portion 12 with a section removed from the rear end. A shaft 19 extends between the rear legs 17 and 18 and is attached to each leg. The shaft 19 may be either movably or fixedly attached and may be made of a metal such as steel. Shaft 19 is used to rotatably mount a paddlewheel 20 which paddlewheel extends beyond the rear portion 12 of the body 10. Hooks 22 can be seen connected to each leg of the rear portion 12.

The paddlewheel 20 will usually be painted a light color such as white and has small glittering reflective pieces of material 21 thereon. These reflective pieces of material 21 reflect light into the water when the lure is moved and the paddles rotate. I have found that a relatively wide paddlewheel with eight (8) paddles operates effectively to reflect a glittering light into the water as well as produce the motion and noise to attract fish.

Turning now to FIGURE 2, a side view of the present lure may be seen with a fishing line 14 connected to eyelet 13; with spinner 15 also connected to eyelet 13. One of the artificial eyes 16 may be seen connected to the front portion 11 of body 10 and a third set of hooks 22 may also be seen. The paddlewheel 20 may be seen protruding from the rear portion 12. As will be understood, the body 10 will normally be decorated such as by painting any of various colors and may have reflective material placed thereon. While a green body having a white and red bottom section has been successfully used, it should be understood that any color scheme could be used without departing from the scope of the invention.

FIGURE 3 is a cutaway end view taken along line 3—3 and shows the paddlewheel 20 having reflection material 21 and shaft 19 with the shaft connected between legs 17 and 18.

One preferred method of using my fishing lure is similar to fishing with other top water surface lures. The lure is cast onto the surface of the water where fish may be located. After landing on the water, it is allowed to remain still for a few seconds and then given a slight jerk. After repeatedly jerking the lure several times without a strike, it is retrieved slowly to provide a turning of the paddlewheel. This method is unlike most lures which are merely cast, retrieved and cast again. My lure thus imitates a frog or other live bait on the surface of the water, while reflecting light signals into the water from the paddlewheel. My hooks have been mounted to catch fish from any angle of approach.

From the foregoing description it will be clear that a fishing lure has been provided for plug or spin casting. The lure as described may be used with a wide range of fish and it should be understood that other variations are contemplated as being within the scope of the invention. The lure body and paddlewheel, for instance, will normally be made of plastic which may be cheaply formed but could also be made of wood. Also, the lure may be made of different sizes and weights such as ⅝ ounce for plug casting and ⅜ ounce for spin casting.

This invention is not to be construed as limited to the particular form disclosed herein, since this is to be regarded as illustrative rather than restrictive.

I claim:

1. A fishing lure comprising: an elongated body adapted to float on the surface of a body of water and having front and rear portions; said front portion of said body having an eyelet connected thereto for attaching a fishing line and a rotatable spinner connected to said eyelet; said rear portion of said body having a pair of separated legs; a shaft located transverse said body between said legs and fixedly attached to each said leg; and a paddlewheel having a plurality of substantially flat paddles radially disposed around said shaft and rotatably mounted on said shaft and adapted to rotate as said lure is pulled through water; said paddlewheel having specks of reflective material located on the surface thereof for reflecting a glittering light into the water as said paddlewheel is rotated; the paddles on said paddlewheel also extending above, below and to the rear of said elongated body, said paddles also extending rearwardly beyond the rearward extremities of said legs, and said elongated body having hooks attached thereto.

2. The fishing lure according to claim 1 in which said paddlewheel has eight paddles thereon.

3. The fishing lure according to claim 2 in which said front portion of said elongated body has a pair of artificial eyes.

References Cited

UNITED STATES PATENTS

| | | | |
|---|---|---|---|
| 1,007,007 | 10/1911 | Pflueger | 43—42.14 X |
| 1,792,366 | 2/1931 | Ettles | 43—42.26 X |
| 2,188,753 | 1/1940 | Jennings | 43—42.32 |
| 2,333,425 | 11/1943 | Jackson | 43—42.12 |
| 2,341,234 | 2/1944 | O'Byrne | 43—42.12 |
| 2,347,609 | 4/1944 | Phillips | 43—42.12 |
| 2,353,995 | 7/1944 | Conner | 43—42.32 XR |
| 2,574,702 | 11/1951 | Moulton | 43—42.12 |
| 2,752,718 | 7/1956 | Poniatowski | 43—42.12 X |
| 2,819,553 | 1/1958 | Fultz | 43—42.12 |

SAMUEL KOREN, Primary Examiner

J. H. CZERWONKY, Assistant Examiner

U.S. Cl. X.R.

43—42.14, 42.17, 42.32